United States Patent Office 2,838,914
Patented June 17, 1958

2,838,914
ISONICOTINIC ACID HYDRAZIDE DERIVATIVES

Jack Bernstein, New Brunswick, and William A. Lott, Maplewood, N. J., assignors to Olin Mathieson Chemical Corporation, New York, N. Y., a corporation of Virginia No Drawing. Application July 3, 1957
Serial No. 669,709

15 Claims. (Cl. 260—292)

This invention relates to new chemical compounds and more particularly to new isonicotinic acid hydrazide and hydrazone derivatives of tropinones.

The compounds of this invention include bases of the general formula

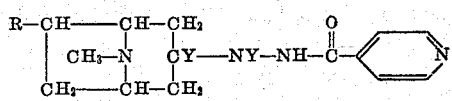

wherein R is hydrogen, lower alkyl, hydroxy, or lower alkoxy, and the Y's represent either hydrogen or together an additional bond; and salts thereof.

The compounds of this invention are prepared by the process of this invention which essentially comprises condensing a tropinone of the general formula

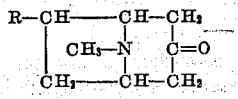

wherein R is as above defined, with isonicotinic acid hydrazide, and if desired reducing the resultant hydrazone to the corresponding hydrazide. The first reaction is preferably conducted in an aqueous medium and may be carried out at any normal temperature. For ease in handling, the reaction is preferably allowed to proceed at ambient temperature.

If desired, the hydrazone formed can be reduced by treating with hydrogen in the presence of a hydrogenation catalyst such as a noble metal catalyst (e. g., platinum oxide or palladium on charcoal) or nickel, the reaction preferably being conducted under an atmosphere of hydrogen at superatmospheric pressure.

To prepare the salts of this invention, the base is interacted with the desired acid, preferably in an organic solvent for the base, whereby the salt formed precipitates and may be recovered by filtration or centrifugation. Although any acid may be employed, if the compounds are to be used as therapeutic agents, the preferred acids are those which are non-toxic. Such acids include inorganic acids, such as the hydrohalic (e. g., hydrochloric), sulfuric, nitric and phosphoric acid, and organic acids, such as oxalic, tartaric, citric, acetic and succinic acid.

The compounds of this invention possess both tuberculostatic and central nervous system stimulant activities. Thus, they may be used instead of known tuberculostatic agents, such as streptomycin, in the treatment of tuberculosis, or instead of known central nervous system stimulants, such as pipradol or amphetamine, in the treatment of emotionally tired and depressed patients. For these purposes they are administered perorally with dosage adjusted for the relative potency of the given compound.

The following examples illustrate the invention (all temperatures being in centigrade):

EXAMPLE 1

*Isonicotinic acid 2-(6-hydroxy-3-tropanylidene)hydrazide oxalate [R is HO; the Y's are an additional bond]*

A solution of 15.5 g. (0.1 mole) of 6-hydroxytropinone and 13.7 g. (0.1 mole) of isonicotinic acid hydrazide in 250 cc. of water is allowed to stand at room temperature under nitrogen for 24 hours. The solution is diluted to 800 c. and freeze-dried to yield about 26 g. of isonicotinic acid 2 - (6 - hydroxy - 3 - tropanylidene)hydrazide [isonicotinic acid 2 - (6 - hydroxy - 8 - methyl - 8 - azabicyclo[3,2,1]-octan-3-ylidene)hydrazide].

To a solution of 6 g. (0.022 mole) of isonicotinic acid 2-(6-hydroxy-3-tropanylidene)hydrazide in 250 cc. of absolute alcohol is added a solution of 2.8 g. (0.022 mole) of oxalic acid in 100 cc. of absolute alcohol. A light tan crystalline solid precipitates, which after drying weighs about 5 g.; M. P. about 153–154° (dec.). This compound is the mono-oxalate salt of isonicotinic acid 2-(6-hydroxy-3-tropanylidene)hydrazide.

EXAMPLE 2

*Isonicotinic acid 2-(6-hydroxy-3-tropanyl)hydrazide dioxalate [R is HO; Y is H]*

A solution of 13.7 g. (0.05 mole) of isonicotinic acid 2-(6-hydroxy-3-tropanylidene)hydrazide in 100 cc. of absolute alcohol is shaken at 50–60° for six hours at a pressure of 50 p. s. i. of hydrogen in the presence of 1 g. of 5% palladium on carbon and 100 mg. of $PtO_2$. The catalysts are filtered off and to the alcohol filtrate is added a solution of 9 g. (0.1 mole) of oxalic acid in 200 cc. of absolute alcohol. A white precipitate forms which becomes gummy on standing. The solvent is decanted and the gummy residue (about 16 g.) is dissolved in 100 cc. of methanol, treated with Darco (activated carbon), filtered, and the product precipitated with anhydrous ether. After redissolving in methanol and reprecipitating with dry ether, the product weights about 8 g.; M. P. about 115–120° (dec.).

EXAMPLE 3

*Isonicotinic acid 2-(6-methoxy-3-tropanylidene)hydrazide oxalate [R is $CH_3O$; the Y's are an additional bond]*

A solution of 13.7 g. (0.1 mole) of isonicotinic acid hydrazide in 100 cc. of water is added to a solution of 16.9 g. (0.1 mole) of 6-methoxytropinone in 150 cc. of water. The resulting solution is allowed to stand at room temperature for 60 hours and is then diluted to 400 cc. with water and freezed-dried. A hydroscopic viscous residue of about 22 g. (75%) of isonicotinic acid 2-(6-methoxy-3-tropanylidene)-hydrazide [isonictonic acid 2-(6-methoxy-8 - methyl - 8 - azabicyclo [3,2,1]octan - 3 - ylidene)hydrazine] is obtained.

A 2.5 g. (0.008 mole) sample of isonicotinic acid 2-(6-methoxy - 3 - tropanylidene)hydrazine is dissolved in 50 cc. of absolute alcohol and to it is added a solution of 0.72 g. (0.008 mole) of oxalic acid in 75 cc. of absolute alcohol. The solid which precipitates melts at about 115–120°, and is the mono-oxalate of isonictotinic acid 2-(6-methoxy-3-tropanylidene)hydrazide.

EXAMPLE 4

*Isonicotinic acid 2-(6-methoxy-3-tropanyl)hydrazide dioxalate [R is $CH_3O$; Y is H]*

A solution of 22 g. (0.076 mole) of isonicotinic acid 2-(6-methoxy-3-tropanylidene)hydrazide in 100 cc. of absolute alcohol in the presence of 1 g. of 5% palladium on charcoal and 100 mg. of $PtO_2$ is shaken at 50 p. s. i. hydrogen and at 50–60° for 14 hours. The catalysts are filtered off and the alcohol filtrate concentrated to dryness under reduced pressure and nitrogen. The residue (about 22 g.), representing isonicotinic acid 2-(6-methoxy-3-tropanyl)hydrazide, is dissolved in 300 cc. of dry acetonitrile and to it is added 3.5 g. of oxalic acid in 200 cc. of dry acetonitrile. The crystalline solid which precipitates is filtered and dried. Weight about 18 g.; M. P. about 85–95°. After recrystallization from 600 cc. of absolute alcohol, the dioxalate melts at about 137–140°.

Similarly, by substituting tropinone, 6-methyl-tropinone or other 6-(lower alkyl)tropinones or 6-(lower alkoxy)tropinones for the 6-methoxytropinone reactant in Example 3, the corresponding derivatives are produced. Thus, tropinone, 6-methyltropinone, 6-ethoxytropinone and 6-n-butoxytropinone yield isonicotinic acid 2-(3-tropanylidene)hydrazide oxalate, isonicotinic acid 2-(6-methyl-3-tropanylidene)hydrazide oxalate, isonicotinic acid 2-(6-ethoxy-3-tropanylidene) hydrazide oxalate, and isonicotinic acid 2-(6-n-butoxy-3-tropanylidene)hydrazide oxalate, respectively, which in turn can be converted by the procedure of Example 4 to their corresponding tropanyl derivatives.

The invention may be otherwise variously embodied within the scope of the appended claims.

What is claimed is:

1. A compound selected from the group consisting of bases of the general formulae

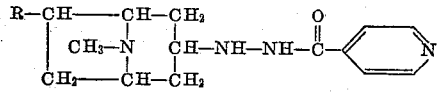

and

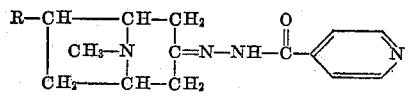

and salts thereof, wherein R is selected from the group consisting of hydrogen, lower alkyl, hydroxy, and lower alkoxy.

2. Isonicotinic acid 2-(6-hydroxy-3-tropanylidene)-hydrazide.

3. A non-toxic acid-addition salt of isonicotinic acid 2-(6-hydroxy-3-tropanyl)hydrazide.

4. Isonicotinic acid 2-[6-(lower alkoxy)-3-tropanylidene]hydrazide.

5. Isonicotinic acid 2-[6-(lower alkoxy)-3-tropanyl]hydrazide.

6. A non-toxic acid-addition salt of isonicotinic acid 2-[6-(lower alkoxy)-3-tropanyl]hydrazide.

7. Isonicotinic acid 2-(6-methoxy-3-tropanylidene)-hydrazide.

8. Isonicotinic acid 2-(6-methoxy-3-tropanyl)-hydrazide.

9. Isonicotinic acid 2-(6-methoxy-3-tropanyl)-hydrazide dioxalate.

10. A process for preparing a compound of the general formula

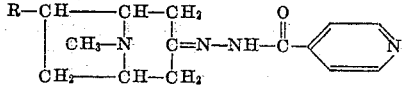

wherein R is selected from the group consisting of hydrogen, lower alkyl, hydroxy, and lower alkoxy, which comprises condensing a compound selected from the group consisting of tropinone, 6-(lower alkyl)tropinone, 6-hydroxytropinone, and 6-(lower alkoxy)tropinone with isonicotinic acid hydrazide and recovering the resultant product.

11. The process of claim 10 wherein 6-hydroxytropinone is reacted with isonicotinic acid hydrazide.

12. The process of claim 10 wherein 6-methoxytropinone is reacted with isonicotinic acid hydrazide.

13. A process for preparing a compound selected from the group consisting of bases of the general formula

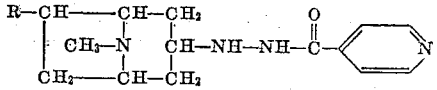

wherein R is selected from the group consisting of hydrogen, lower alkyl, hydroxy, and lower alkoxy, and salts thereof, which comprises treating the corresponding tropanylidene compound selected from the group consisting of bases of the general formula

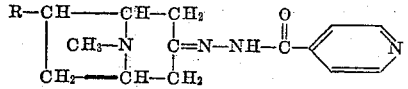

wherein R is as above-defined, and salts thereof with hydrogen in the presence of a hydrogenation catalyst.

14. The process of claim 13 wherein the tropanylidene is a salt of isonicotinic acid 2-(6-methoxy-3-tropanylidene)hydrazide.

15. The process of claim 13 wherein the tropanylidene is a salt of isonicotinic acid 2-(6-hydroxy-3-tropanylidene)hydrazide.

No references cited.